(No Model.)
A. W. SWIFT.
LUBRICATOR.
No. 301,301. Patented July 1, 1884.
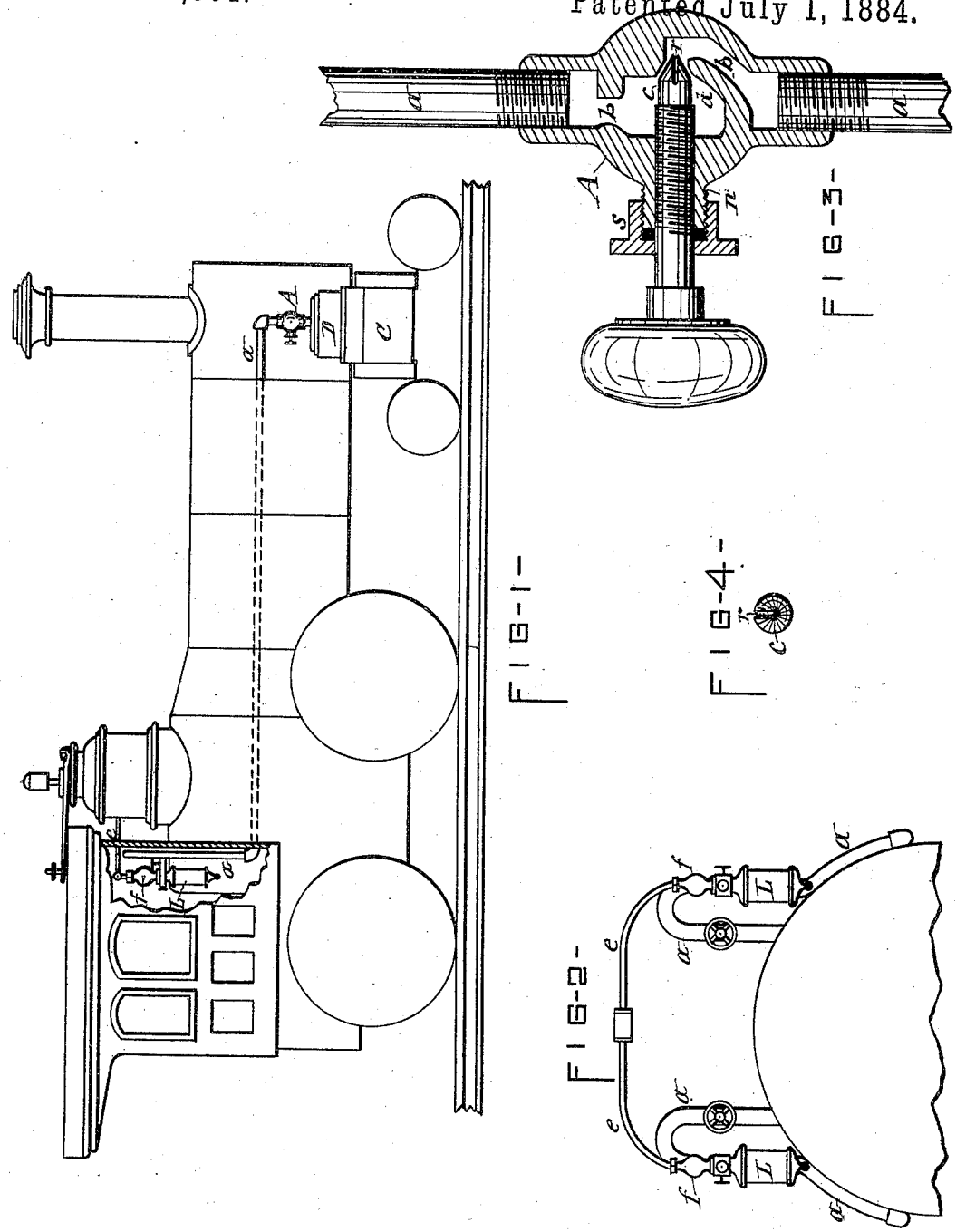
ATTEST—
Geo. E. Raymond.
J. H. Gibbs
INVENTOR—
Allen W. Swift
per Duell, Laass & Hey
his Attys

UNITED STATES PATENT OFFICE.

ALLEN W. SWIFT, OF ELMIRA, NEW YORK.

LUBRICATOR.

SPECIFICATION forming part of Letters Patent No. 301,301, dated July 1, 1884.

Application filed January 16, 1884. (No model.)

*To all whom it may concern:*

Be it known that I, ALLEN W. SWIFT, of Elmira, in the county of Chemung, in the State of New York, have invented new and useful Improvements in Lubricators, of which the following, taken in connection with the accompanying drawings, is a full, clear, and exact description.

This invention relates to lubricators designed for lubricating the cylinders and valves of steam-engines, and which convey the lubricant to the parts to be lubricated by means of a steam duct or pipe communicating with the discharge-duct of the lubricant-reservoir. My present invention is designed more particularly as an improvement on the lubricating device for which I have obtained United States Letters Patent No. 272,793, dated February 20, 1883, in which I place in the combined steam and lubricant duct a choked throat for the purpose of partly intercepting the pressure of steam from either direction, and thus equalizing said pressure in the aforesaid duct between the choked throat and the lubricant-reservoir, and thereby equalizing the flow of lubricant through the duct to the parts to be lubricated. Experience has proven that it is desirable to have the aforesaid choked throat variable, so as to permit of increasing or diminishing the flow of lubricant through it as may be desired, and it has also been found that the choked throat is liable to become clogged; and although, in my aforesaid prior patent, certain provision was made for meeting the aforesaid want and for preventing the clogging of the choked throat, yet it entailed the labor of uncoupling the pipe for either introducing diaphragms with apertures of different sizes, or for cleaning the diaphragm, which constituted the choked throat.

The object of my present invention is to facilitate the regulating and cleaning of the aforesaid choked throat; and to that end my invention consists in the combination, with a steam-duct communicating at opposite ends, respectively, with the boiler and with the parts to be lubricated, of a constant relatively reduced passage and a variable passage in the duct controlled by a valve, and a lubricant-cup having its delivery communicating with the said steam-duct at a point between the aforesaid passages and steam-receiving end of the duct, all as hereinafter more fully explained.

In the accompanying drawings, Figure 1 is an outline of a locomotive, illustrating the application of my invention to the same. Fig. 2 is an enlarged view illustrating the connection of the lubricator with the boiler of an engine. Fig. 3 is an enlarged longitudinal section of my invention and the portion of the steam-pipe to which it is applied, and Fig. 4 is a detached end view of the valve constituting part of my invention.

Similar letters of reference indicate corresponding parts.

L represents a lubricant cup or reservoir of any suitable form and construction, but preferably of the style commonly designated "displacement lubricators," in which condensed steam is allowed to enter the reservoir to displace the lubricant therein, and force the same through the discharge-duct thereof into a steam-pipe, *a*, with which the lubricant-cup is connected, said pipe *a* tapping the steam-space of the boiler at the cab of the engine, and being extended along the side of the boiler underneath the usual jacket thereof, as indicated by dotted lines in Fig. 1 of the drawings, and terminating at the steam-chest D, with which it communicates. The water of condensation required for the aforesaid displacement of the lubricant in the cup is obtained by a pipe, *e*, which is extended from the dome of the boiler to the usual condenser, *f*, of the lubricator, from which condenser the water descends to the bottom of the subjacent cup L, the arrangement of the aforesaid parts being similar to that described in my prior patent hereinbefore referred to, and illustrated in Fig. 2 of the drawings hereto annexed.

To the lubricant-conveying portion of the pipe *a*, I apply a valve, A, preferably of a globe pattern, the channel *b*, which is extended through the globe, being interrupted by a valve, *c*, which is fitted to a seat, *d*, in the cavity or passage of the globe, as shown in Fig. 3 of the drawings, the stem of said valve being screw-threaded and projected through a correspondingly screw-threaded nipple, *n*, on the globe, and a stuffing-box, *s*, being applied to the exterior of said nipple in the usual manner, to prevent leakage around the valve-stem.

By a knob on the outer end of the valve-stem the latter can be turned so as to cause it to be moved inward or outward by the screw-threaded portion thereof, and thus carry the valve c onto or off from the valve-seat d, to close or open the passage through the globe, as may be desired. The valve c is provided with a small channel, r, the opening of which remains undisturbed by the closing of the valve, and thus forms a constant relatively-reduced passage for the steam and lubricant through the globe. Said reduced passage serves the functions of the choked throat described in my prior patent hereinbefore mentioned—i. e., it intercepts to a great extent the pressure of steam from either direction, and equalizes said pressure in the pipe a between the valve A and lubricator L, and consequently equalizes, also, the flow of lubricant, which readily finds its way through the channel r of the valve, and thence to the interior of the steam-chest and cylinder. Even when the engine is running under a full head of steam, the constant pressure of steam in the pipe a toward the steam-chest enables the lubricant to force its way through the partly-choked throat or contracted channel r; and in case a vacuum is produced in the cylinder by shutting off the steam, or a back-pressure of steam is produced by reversing the engine while in motion, the aforesaid contracted channel r arrests the rush of steam through the pipe a and maintains the steam between the valve A and lubricator at nearly or quite uniform pressure, and thus equalizes the flow of lubricant under all circumstances. When it is desired to increase the flow of lubricant or to clean the contracted channel r, the valve c can be withdrawn from the seat d to the required extent; then, by shutting off steam from the cylinder, the rush of steam through the pipe a and valve A toward the steam-chest D effectually cleanses the channel r in the valve c.

It will be observed that in my present invention the component parts of the lubricating device are maintained in the same relation to each other as in my former patent of February 20, 1883—i. e., the lubricant-cup has its delivery communicating with the steam-duct at a point between the choked throat and steam-receiving end of said duct, the only difference being that in my present invention the choked throat consists of a constant relatively reduced passage and a variable passage in the duct, which variable passage is controlled at will by the person in charge of the engine.

Having described my invention, what I claim as new, and desire to secure by Letters Patent, is—

1. The combination, with a steam-duct communicating at opposite ends, respectively, with the boiler and with the parts to be lubricated, of a constant relatively reduced passage and a variable passage in the duct controlled by a valve, and a lubricant-cup having its delivery communicating with said steam-duct at a point between the aforesaid passages and steam-receiving end of the duct, substantially as specified.

2. In combination with a steam-duct extended from the boiler to the steam-chest, and a lubricant-reservoir having its delivery communicating with said duct, a valve applied to the steam-duct between the lubricant-reservoir and steam-chest, and a contracted constant channel through said valve, all combined and operating to clean the contracted channel by the rush of steam through the valve incident to the opening of the latter, substantially as described.

In testimony whereof I have hereunto signed my name and affixed my seal, in the presence of two attesting witnesses, at Syracuse, in the county of Onondaga, in the State of New York, this 29th day of December, 1883.

ALLEN W. SWIFT. [L. S.]

Witnesses:
 FREDERICK H. GIBBS,
 WM. C. RAYMOND.